United States Patent
Amari et al.

(10) Patent No.: US 10,038,343 B2
(45) Date of Patent: Jul. 31, 2018

(54) POWER RECEPTION APPARATUS AND WIRELESS POWER TRANSMISSION METHOD

(71) Applicant: HONDA MOTOR CO., LTD., Tokyo (JP)

(72) Inventors: Yusaku Amari, Wako (JP); Tomoaki Nakagawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 204 days.

(21) Appl. No.: 15/214,459

(22) Filed: Jul. 20, 2016

(65) Prior Publication Data

US 2017/0025900 A1    Jan. 26, 2017

(30) Foreign Application Priority Data

Jul. 22, 2015 (JP) ................................. 2015-144830

(51) Int. Cl.
*H02J 50/12* (2016.01)
*H02J 50/80* (2016.01)
*B60L 11/18* (2006.01)

(52) U.S. Cl.
CPC ............. *H02J 50/12* (2016.02); *B60L 11/182* (2013.01); *H02J 50/80* (2016.02)

(58) Field of Classification Search
CPC .......... H02J 50/12; H02J 50/80; B60L 11/182
See application file for complete search history.

(56) References Cited

U.S. PATENT DOCUMENTS

| | | | | |
|---|---|---|---|---|
| 2011/0022259 A1* | 1/2011 | Niwa | ..................... | B60K 6/365 701/22 |
| 2012/0133215 A1* | 5/2012 | Lai | .......................... | H01F 38/14 307/104 |
| 2012/0200151 A1* | 8/2012 | Obayashi | .............. | B60L 11/123 307/9.1 |
| 2013/0119774 A1* | 5/2013 | Ichikawa | ............... | B60L 11/123 307/104 |
| 2013/0134927 A1* | 5/2013 | Park | ..................... | H04B 5/0037 320/107 |
| 2013/0181824 A1* | 7/2013 | Kimura | .............. | G07C 9/00182 340/438 |

(Continued)

FOREIGN PATENT DOCUMENTS

JP          2011-259585         12/2011

*Primary Examiner* — Jared Fureman
*Assistant Examiner* — Esayas Yeshaw
(74) *Attorney, Agent, or Firm* — Mori & Ward, LLP

(57) ABSTRACT

A power reception apparatus includes a power reception coil, a relative distance detection section, a power transmission efficiency detection section, a database, a power transmission frequency setting section, and a power transmission request section. The power transmission frequency setting section is configured to read from the database a resonance frequency corresponding to a combination of a relative distance and an initial transmission efficiency and to set the read resonance frequency as a power transmitting frequency. The power transmission request section is configured to notify the power transmission apparatus of the power transmission frequency set by the power transmission frequency setting section to request wireless power transmission with the power transmission frequency.

12 Claims, 9 Drawing Sheets

(56) References Cited

U.S. PATENT DOCUMENTS

| | | | |
|---|---|---|---|
| 2015/0008877 A1* | 1/2015 | Ichikawa | H01F 27/362 320/108 |
| 2016/0023558 A1* | 1/2016 | Hika | H02J 50/40 320/108 |
| 2016/0063784 A1* | 3/2016 | Murakami | G07C 9/00309 340/5.61 |
| 2017/0203656 A1* | 7/2017 | Okamoto | B60L 11/182 |

* cited by examiner

POWER RECEPTION APPARATUS AND WIRELESS POWER TRANSMISSION METHOD

CROSS REFERENCE TO RELATED APPLICATIONS

The present application claims priority under 35 U.S.C. § 119 to Japanese Patent Application No. 2015-144830, filed Jul. 22, 2015, entitled "Power Reception Apparatus and Wireless Power Transmission Method." The contents of this application are incorporated herein by reference in their entirety.

BACKGROUND

1. Field

The present disclosure relates to a power reception apparatus and a wireless power transmission method.

2. Description of the Related Art

Japanese Unexamined Patent Application Publication No. 2011-259585 (JP2011-259585A) provides a vehicle power feeding device capable of maintaining high power transmission efficiency ([0006], Abstract). To this end, in power transmission using magnetic resonance according to JP2011-259585A, first and second CCD cameras 14, 15 are used to measure distance between a power transmission coil 12 and a power reception coil 21 (Abstract, S2 in FIG. 5). Then, a resonance frequency fr of the power transmission coil 12 is adjusted through a frequency adjustment unit 30 based on the measured distance between the respective coils 12, 21 (Abstract, S2 in FIG. 5). Then, reactance of a variable coil 32 and electrostatic capacitance CV of a variable condenser 33 on the side of a vehicle 20 are set based on the resonance frequency fr (S3 in FIG. 5).

SUMMARY

According to one aspect of the present invention, a power reception apparatus uses resonant magnetic coupling to receive wireless power transmission from a power transmission apparatus and includes a power reception coil, a relative distance detection section, a power transmission efficiency detection section, a database, a power transmission frequency setting section, and a power transmission request section. The power reception coil is configured to receive power from a power transmission coil of the power transmission apparatus. The relative distance detection section is configured to detect a relative distance between the power transmission coil and the power reception coil. The power transmission efficiency detection section is configured to detect initial power transmission efficiency of the wireless power transmission performed by using an initial default value of a resonance frequency. The database is configured to store a combination of the relative distance and the power transmission efficiency, and the resonance frequency corresponding to the combination. The power transmission frequency setting section is configured to read from the database the resonance frequency corresponding to the combination of the relative distance and the initial transmission efficiency and to set the read resonance frequency as a power transmitting frequency to be used in the wireless power transmission. The power transmission request section is configured to notify the power transmission apparatus of the power transmission frequency set by the power transmission frequency setting section and request the wireless power transmission with the power transmission frequency.

According to another aspect of the present invention, a power reception apparatus includes a power reception coil, a relative distance detector, a memory, a power transmission frequency selector, and a power transmission request device. The power reception coil is to receive power from a power transmission coil of a power transmission apparatus in wireless power transmission. The relative distance detector is to detect a relative distance between the power transmission coil and the power reception coil. The memory is to store a database. The data base includes first combinations and resonance frequencies respectively correspond to the first combinations. The first combinations each includes a reference relative distance and a reference state-of-charge parameter indicating a state of charge of an electricity storage. The power transmission frequency selector is to select a power transmission frequency from the resonance frequencies of the database based on a combination of the relative distance and a state of charge parameter acquired by a state-of-charge-parameter acquisition device. The power transmission request device is to transmit the power transmission frequency to the power transmission apparatus to perform the wireless power transmission based on the power transmission frequency.

According to further aspect of the present invention, in a wireless power transmission method, a relative distance between a power transmission coil of a power transmission apparatus and a power reception coil of a power reception apparatus is detected by using a relative distance detector. A power transmission frequency is selected from a database by using a power transmission frequency selector based on a combination of the relative distance and a state of charge parameter acquired by a state-of-charge-parameter acquisition device. The database includes first combinations and resonance frequencies respectively corresponding to the first combinations. The first combinations each includes a reference relative distances and a reference state-of-charge parameter indicating a state of charge of an electricity storage. The power transmission frequency is transmitted from a power transmission request device to the power transmission apparatus to perform wireless power transmission based on the power transmission frequency.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
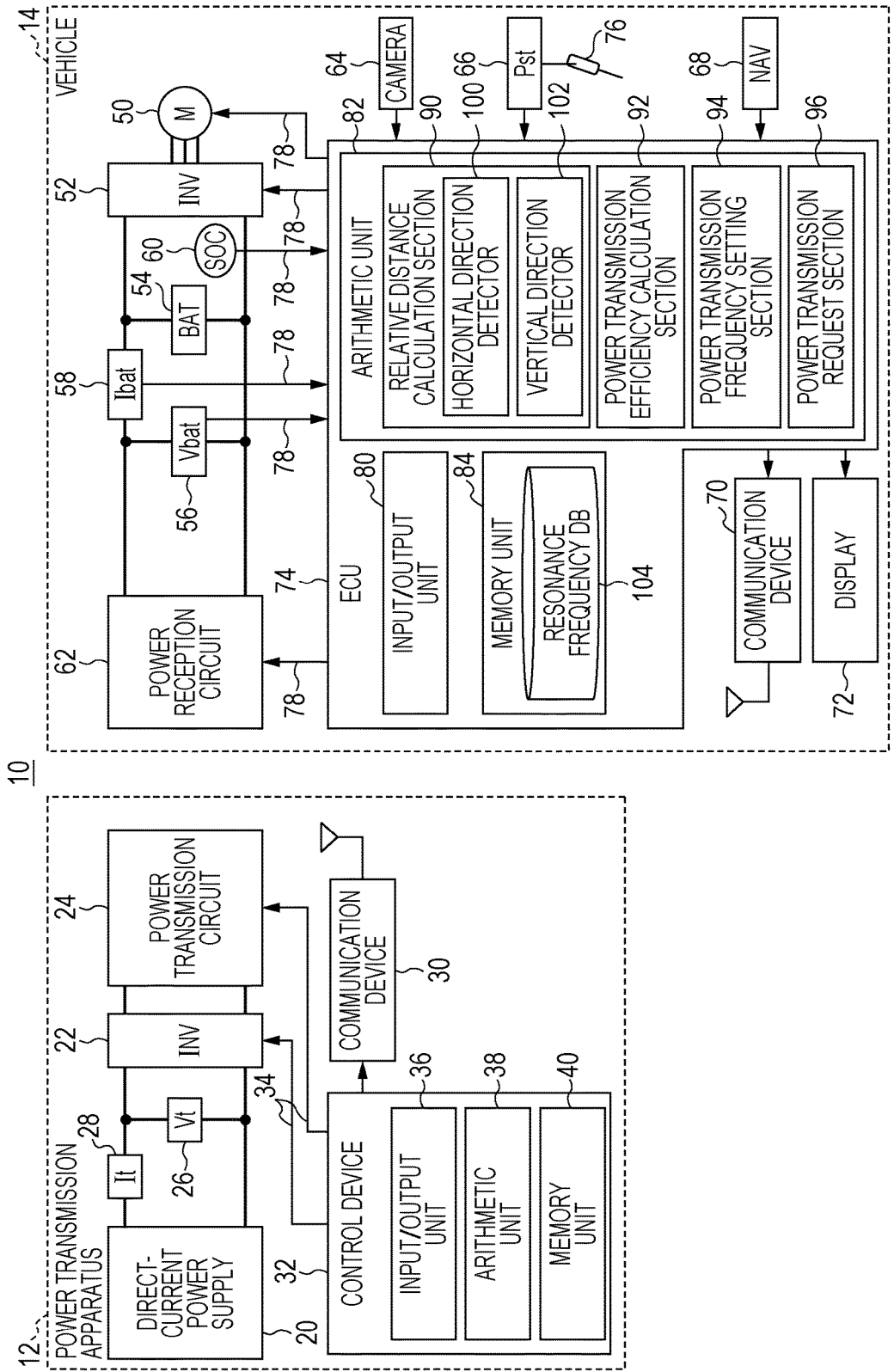
FIG. 1 is a schematic configuration diagram of a wireless power transmission system that implements a wireless power transmission method according to one embodiment of the disclosure.

The embodiments will now be described with reference to the accompanying drawings, wherein like reference numerals designate corresponding or identical elements throughout the various drawings.

A. Embodiment

1. Configuration

[1-1. Overview]

FIG. 1 is a schematic configuration diagram of a wireless power transmission system 10 (hereinafter also referred to as "system 10") that implements a wireless power transmission method according to one embodiment of the disclosure. As shown in FIG. 1, the system 10 has a power transmission apparatus 12 configured to supply electric power to outside and a vehicle 14 as a power reception apparatus configured to receive power supplied from the power transmission apparatus 12.

[1-2. Power Transmission Apparatus 12]

As shown in FIG. 1, the power transmission apparatus 12 has a direct-current power supply 20, a power transmission inverter 22 (hereinafter also referred to as an "inverter 22"), a power transmission circuit 24, a voltage sensor 26, a current sensor 28, a communication device 30 (hereinafter also referred to as a "transmission-side communication device 30"), and a power transmission control device 32 (hereinafter also referred to as a "control device 32"). An alternating-current power supply may also be used in place of the direct-current power supply 20 and the inverter 22.

The inverter 22 converts a direct-current electric current from the direct-current power supply 20 to an alternating-current and outputs it to the power transmission circuit 24. The power transmission circuit 24 outputs the power from the inverter 22 to the vehicle 14. Details of the power transmission circuit 24 are described below with reference to FIG. 3.

The voltage sensor 26 detects an input voltage (hereinafter referred to as a "power transmission voltage Vt" or a "voltage Vt") [V] from the direct-current power supply 20 to the inverter 22. The current sensor 28 detects an input current (hereinafter referred to as a "power transmission current It" or a "current It") [A] from the direct-current power supply 20 to the inverter 22. The communication device 30 is used for wireless communications with the vehicle 14.

The control device 32 controls the inverter 22 and the power transmission circuit 24 by way of signal lines 34 (FIG. 1). Then, the control device 32 communicates with the vehicle 14 by way of the communication device 30. The control device 32 has an input/output unit 36 as an input/output interface, an arithmetic unit 38 configured to perform various operations, and a memory unit 40 configured to store a program and data used by the arithmetic unit 38.

[1-3. Vehicle 14]

[1-3-1. Overall Configuration]

The vehicle 14 is a so-called electric vehicle having a running motor 50 (hereinafter also referred to as a "motor 50") as a drive source. As described below, the vehicle 14 may be an electric-powered vehicle such as a hybrid vehicle having an engine in addition to the motor 50.

In addition to the running motor 50, the vehicle 14 has a motor drive inverter 52 (hereinafter also referred to as an "inverter 52"), a battery 54 (electricity storage), a voltage sensor 56, a current sensor 58, a SOC sensor 60, a power reception circuit 62, a vehicle-side camera 64, a shift position sensor 66, a navigation device 68, a communication device 70 (hereinafter also referred to as a "vehicle-side communication device 70"), a display 72, and an electronic control unit 74 (hereinafter also referred to as an "ECU 74"). Note that a DC/DC converter, which is not shown, may be arranged between the inverter 52 and the battery 54 to transform an output voltage of the battery 54.

(1-3-2. Motor 50 and Inverter 52)

The motor 50 of the embodiment is of a three-phase alternating-current brushless type. The motor 50 generates drive force based on electric power supplied from the battery 54 to rotate wheels (not shown) through a transmission (not shown) by the drive force. The motor 50 also outputs electric power (regenerative power Preg) [W] generated by regeneration to the battery 54 or the like.

The inverter 52 has a configuration of a three-phase full bridge type to convert between direct currents and alternating currents. More specifically, the inverter 52 supplies to the battery 54 or the like direct currents after alternating current-direct current conversion involved in a regeneration operation, while converting direct currents to three-phase alternating currents to supply them to the motor 50.

(1-3-3. Battery 54, Voltage Sensor 56, Current Sensor 58, and SOC Sensor 60)

The battery 54 is an electricity storage (energy storage) including a plurality of battery cells, and a lithium-ion secondary battery, a nickel hydride secondary battery or the like can be used. An electricity storage such as a capacitor or the like may also be used in place of the battery 54.

The voltage sensor 56 detects an input voltage (hereinafter referred to as a "battery input voltage Vbat" or a "voltage Vbat") [V] from the power reception circuit 62 to the battery 54. The current sensor 58 detects an input current (hereinafter referred to as a "battery input current Ibat" or a "current Ibat") [A] from the power reception circuit 62 to the battery 54. The SOC sensor 60 detects remaining capacity (SOC) [%] of the battery 54.

(1-3-4. Power Reception Circuit 62)

The power reception circuit 62 receives electric power from the power transmission apparatus 12 and have it charged to the battery 54. Details of the power reception circuit 62 are described below with reference to FIG. 3.

(1-3-5. Vehicle-Side Camera 64)

Figure 2:
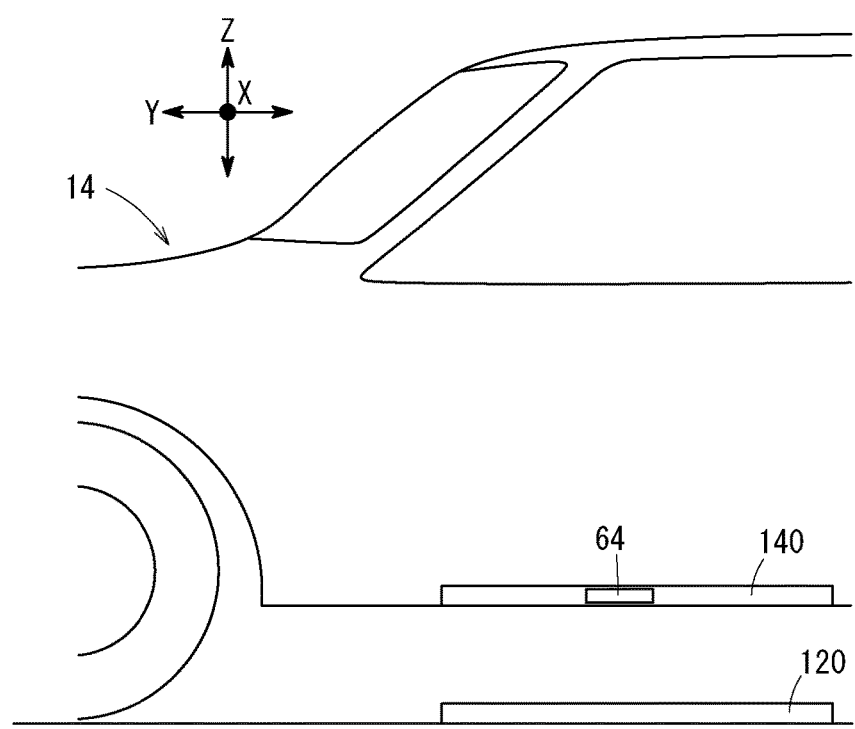
FIG. 2 is a view showing arrangement of a vehicle-side camera in the embodiment.

FIG. 2 is a view showing arrangement of a vehicle-side camera 64 in the embodiment. FIG. 2 shows a case in which the vehicle 14 is parked from the front side thereof. As shown in FIG. 2, the vehicle-side camera 64 (hereinafter also referred to as the "camera 64") is arranged on the bottom part (under the floor) of the vehicle 14 (vehicle body) so that it does not interfere with a power transmission coil 120, images a lower part of the vehicle 14, and outputs the image to the ECU 74. An image captured by the camera 64 is an image of the power transmission coil 120 and its periphery in a width direction (X direction) and an antero-posterior direction (Y direction), and is hereinafter referred to as an "XY image Ixy". Note that when the camera 64 is diagonally arranged with respect to the power transmission coil 120, an image from the camera 64 may be subjected to image processing by the ECU 74 or the like to generate the XY image Ixy.

(1-3-6. Shift Position Sensor 66 and Navigation Device 68)

A shift position sensor 66 detects a position of a shift lever 76 (shift position Ps). A navigation device 68 has a current position detection unit configured to detect a current position of the vehicle 14 (current positon Pcur) and a map information database. The map information database includes map information Imap including a position of a parking lot or the like.

(1-3-7. Communication Device 70)

The communication device 70 is used for wireless communications with the power transmission apparatus 12.

(1-3-8. ECU 74)

The ECU 74 controls the motor 50, the inverter 52, the battery 54, and the power reception circuit 62 by way of signal lines 78 (FIG. 1). In addition, the ECU 74 communicates with the power transmission apparatus 12 by way of the communication device 70 to control power transmission (power supply) from the power transmission apparatus 12. Then, the ECU 74 uses a detection value of various sensors such as the voltage sensor 56, the current sensor 58, the SOC sensor 60, the camera 64 (image sensor), the shift position sensor 66, the navigation sensor 68 (current position sensor), or the like.

The ECU 74 has the input/output unit 80 as an I/O interface, the arithmetic unit 82 configured to perform various types of operations, and the memory unit 84 configured to store a program and data used by the arithmetic unit 82. Note that the ECU 74 includes only one ECU, but may include a plurality of ECUs for each of the motor 50, the inverter 52, the battery 54, and the power reception circuit 62.

The arithmetic unit 82 has a relative distance calculation section 90 (relative distance detector), a power transmission efficiency calculation section 92, a power transmission frequency setting section 94 (power transmission frequency selector), and a power transmission request section 96 (power transmission request device). The relative distance calculation section 90 calculates a relative distance Dtr between the power transmission coil 120 and the power reception coil 140 (FIG. 2) based on the XY image Ixy from the camera 64, transmission efficiency η or the like. The relative distance calculation section 90 has a horizontal direction detector 100 and a vertical direction detector 102.

The horizontal direction detector 100 detects deviations Dx, Dy (hereinafter also referred to as "horizontal deviations Dx, Dy") of the power transmission coil 120 and the power reception coil 140 in the horizontal direction (more specifically, the XY direction). The horizontal deviation Dx is a widthwise (X direction) deviation Dx, and the horizontal deviation Dy is an anteroposterior (Y direction) deviation Dy. The vertical direction detector 102 detects a deviation Dz (hereinafter also referred to as a "vertical deviation Dz") of the power transmission coil 120 and the power reception coil 140 in the vertical direction (more specifically, the Z direction). A combination of the deviations Dx, Dy, Dz substantially represents the relative distance Dtr between the power transmission coil 120 and the power reception coil 140.

The power transmission efficiency calculation section 92 calculates the power transmission efficiency η during wireless transmission. The power transmission frequency setting section 94 sets a power transmission frequency ft during wireless transmission. The power transmission request section 96 requests the power transmission apparatus 12 for power transmission.

The memory unit 84 has a resonance frequency database 104 (hereinafter referred to as a "resonance frequency DB 104" or a "DB 104"). The DB 104 stores various types of data (resonance frequency f, or the like) necessary for setting a power transmission frequency ft (Details are described below with reference to FIGS. 5 and 6).

[1-4. Electric Circuit Related to Wireless Power Transmission (Wireless Power Transmission)]

Figure 3:
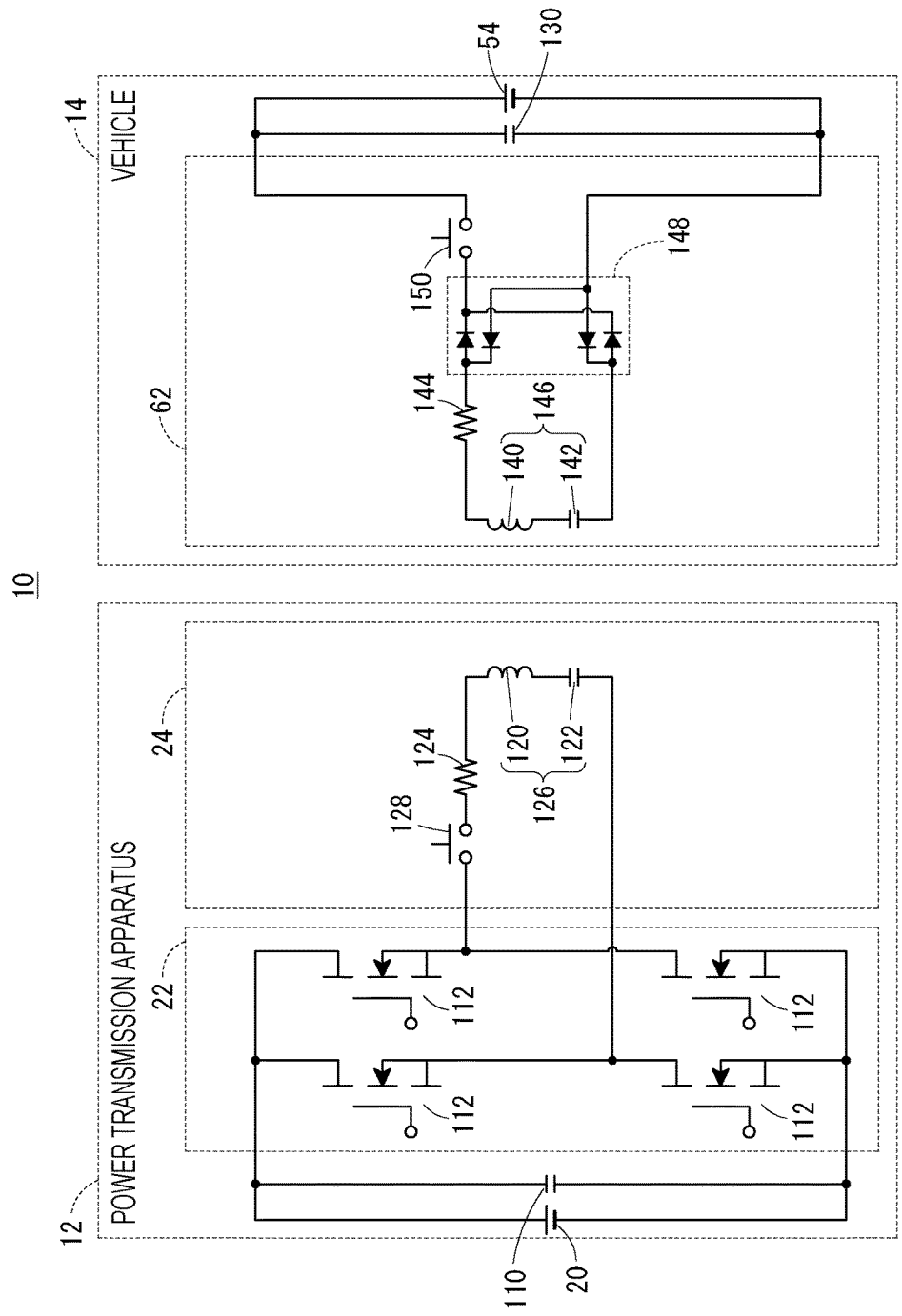
FIG. 3 is a view showing an electric circuit for wireless power transmission from a power transmission apparatus to the vehicle in the embodiment.

FIG. 3 is a view showing an electric circuit for wireless power transmission from the power transmission apparatus 12 to the vehicle 14 in the embodiment.

(1-4-1. Power Transmission Device 12)

As described above, the power transmission apparatus 12 has the direct-current power supply 20, the inverter 22, and the power transmission circuit 24. As shown in FIG. 3, a smoothing condenser 110 is arranged between the direct-current power supply 20 and the inverter 22. Note that in FIG. 3, the voltage sensor 26 and the current sensor 28 are omitted.

The inverter 22 has a full-bridge configuration including four switching elements 112, converts a direct current from the direct-current power supply 20 to an alternating current, and outputs it to the power transmission circuit 24. Each of the switching elements 112 is controlled by the power transmission control device 32 (FIG. 1).

The power transmission circuit 24 outputs the power from the inverter 22 to the vehicle 14. As shown in FIG. 3, the power transmission circuit 24 has a power transmission coil 120 (hereinafter also referred to as a "coil 120"), a condenser 122, and a resistance 124. While the coil 120 is a so-called solenoid coil (tubular coil), it may be any other type of coil. Note that the coil 120 is arranged within a case which is shaped like a pad in appearance. In the power transmission coil 24, the coil 120 and the condenser 122 are connected in series, forming an LC circuit 126. This enables so-called magnetic coupling of magnetic resonance type.

Note that the coil 120 and the condenser 122 may be connected in parallel for magnetic resonance. In addition, a switch 128, which is controlled by the control device 32, is arranged between the LC circuit 126 and the inverter 122.

(1-4-2. Vehicle 14)

As described above, the vehicle 14 has the battery 54 and the power reception circuit 62. As shown in FIG. 3, a smoothing condenser 130 is arranged between the battery 54 and the power reception circuit 62. Note that the voltage sensor 56, the current sensor 58, and the SOC sensor 60 are omitted in FIG. 3.

The power reception circuit 62 receives power from the power transmission apparatus 12 and have it charged to the battery 54. As shown in FIG. 3, the power reception circuit 62 has the power reception coil 140 (hereinafter also referred to as the "coil 140"), a condenser 142, and a resistance 144. While the coil 140 is a so-called solenoid coil (tubular coil), it may be any other type of coil. Note that the coil 140 is arranged within a case which is shaped like a pad in appearance. In the power reception coil 62, the coil 140 and the condenser 142 are connected in series, forming an LC circuit 146. This enables so-called magnetic coupling of magnetic resonance type.

Note that the coil 140 and the condenser 142 may be connected in parallel for magnetic resonance. In addition, a rectification circuit 148 and a switch 150 are arranged between the LC circuit 146, the battery 54, and the smoothing condenser 130.

2. Various Types of Controls

[2-1. Overview]

In the embodiment, the power transmission apparatus 12 performs power transmission preparation control related to preparation before power transmission and power transmission control in which power is actually transmitted to the vehicle 14 (power reception apparatus). The vehicle 14 performs power reception preparation control related to preparation before power reception and power reception control in which power from the power transmission apparatus 12 is actually received. In the following, power reception preparation control, power transmission preparation control, power transmission control, and power reception control are described in order.

[2-2. Power Reception Preparation Control]

Figure 4:
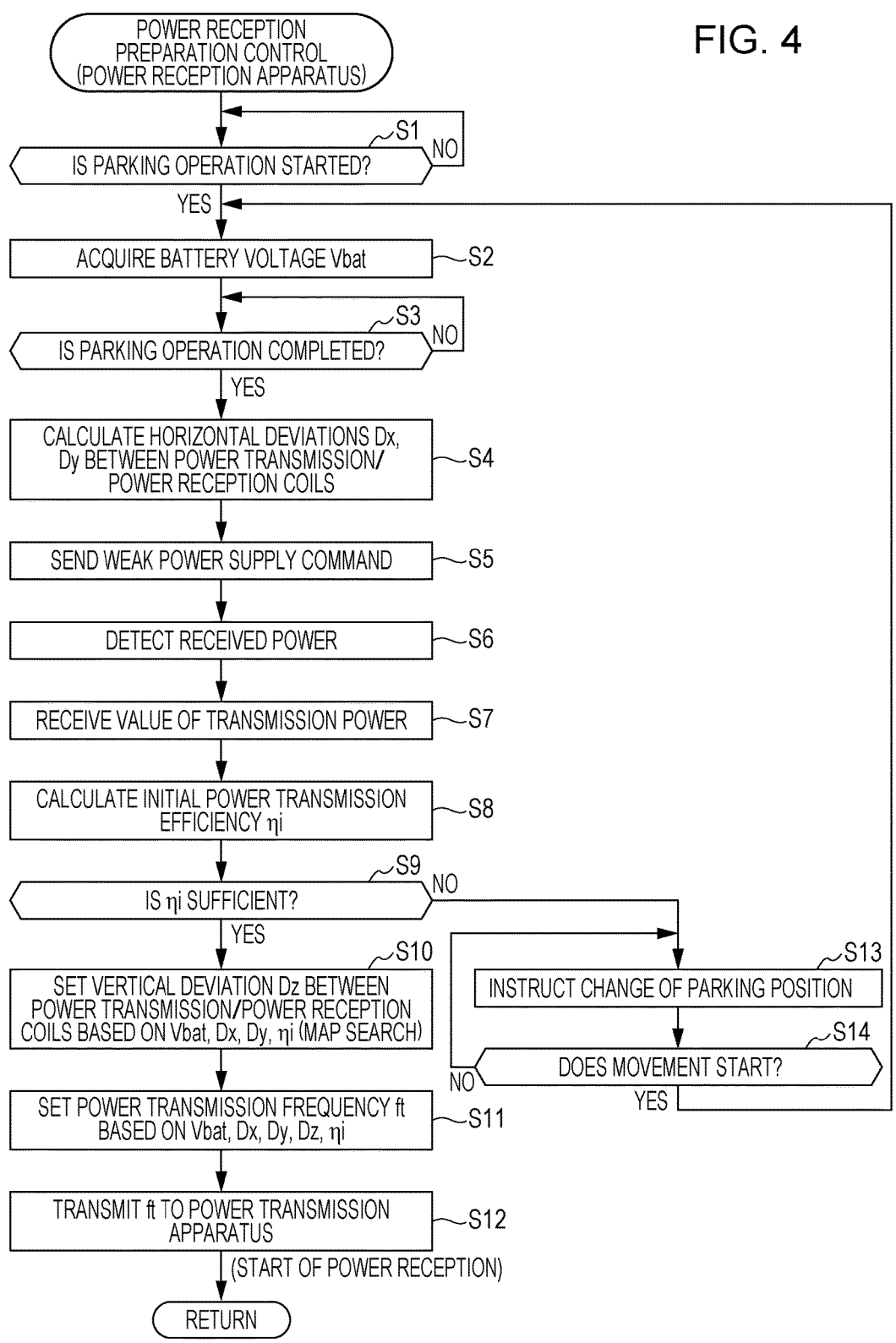
FIG. 4 is a flow chart of power reception preparation control in the embodiment.

FIG. 4 is a flow chart of power reception preparation control in the embodiment. Each of steps S1 to S14 in FIG. 4 is performed by the arithmetic unit 82 of the ECU 74. Of steps S1 to S14, step S4 is performed by the horizontal direction detector 100. Steps S5 to S8 are performed by the power transmission efficiency calculation section 92. Step S10 is performed by the vertical direction detector 102. Step S11 is performed by the power transmission frequency setting section 94. Step S12 is performed by the power transmission request section 96.

In step S1, the ECU 74 determines whether or not the vehicle 14 starts a parking operation. The determination is made depending on whether or not a shift position Ps from the shift position sensor 66 is Retracted (R). Alternatively, based on map information Imap from the navigation device 68 and current position information, the determination may also be made depending on whether or not the vehicle 14 is running in a parking lot. Then, triggered by detection of a mark (white line) indicating a parking position at the back or front of the vehicle 14, it may be determined that the parking operation starts.

When the parking operation is not started (S1: NO), step S1 is repeated at a predetermined cycle. When the parking operation is started (S1: YES), the ECU 74 acquires a battery voltage Vbat from the voltage sensor 56 in step S2.

In step S3, the ECU 74 determines whether or not the parking operation of the vehicle 14 is completed. The determination is made based on, for example, whether or not a shift position Ps is Parking (P). Alternatively, the determination may also be made based on whether or not an ignition switch, not shown, is turned off. If the parking operation is not completed (S3: NO), the ECU 74 repeats step S3. When the parking operation is completed (S3: YES), it proceeds to step S4.

In step S4, the ECU 74 calculates horizontal deviations Dx, Dy of the power transmission coil 120 and the power reception coil 140. Specifically, the ECU 74 determines a position of the power transmission coil 120 based on an XY image Ixy from the camera 64. Then, the ECU 74 calculates the deviations Dx, Dy from a reference position (position of the power reception coil 140) in the XY image Ixy.

In step S5, the ECU 74 sends a weak power supply command to the control device 32 of the power transmission apparatus 12. A weak power supply command is a command requesting supply of weak power (hereinafter referred to as "weak power Pw") which is weaker than a default value of a transmission frequency ft. In step S6, in response to the weak power supply command, the ECU 74 detects weak power Pw (reception power Pr) supplied from the power transmission apparatus 12. In step S7, the ECU 74 receives from the power transmission apparatus 12 a value of the weak power Pw (transmission power Pt) detected by the power transmission apparatus 12.

In step S8, the ECU 74 calculates power transmission efficiency η. The power transmission efficiency η is determined from a ratio of power Pr (reception power Pr) received by the vehicle 14 to power (Pt (transmission power Pt) supplied by the power transmission apparatus 12 (η=Pr/Pt). A value of the transmission power Pt is notified by the control device 32, accompanying the weak power supply command. The reception power Pr is calculated as a product of a battery voltage Vbat from the voltage sensor 56 and a battery current Ibat from the current sensor 58. Note that in order to distinguish from transmission efficiency η calculated in the power reception control described below, the power transmission efficiency η in step S8 is hereinafter also referred to as initial power transmission efficiency ηi.

Figure 5:
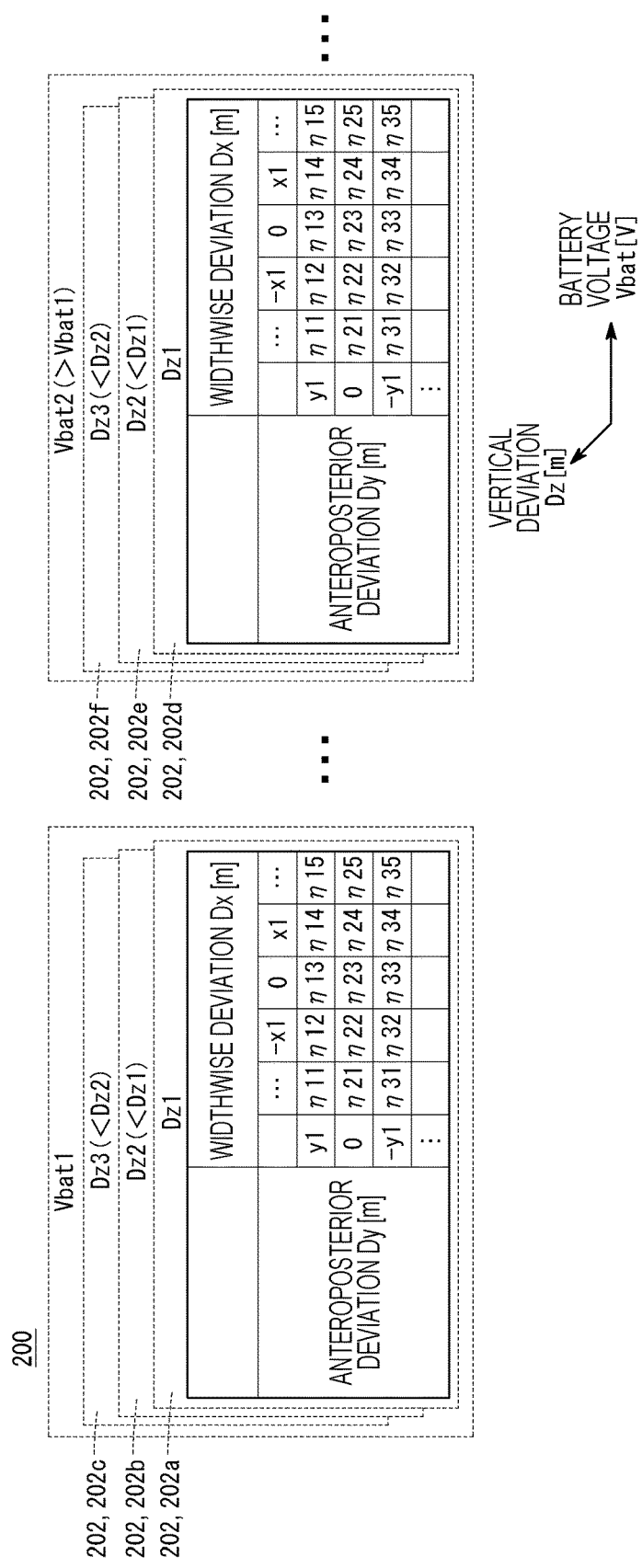
FIG. 5 is a view conceptually showing content of a vertical deviation determination map group in the embodiment.

In step S9, the ECU 74 determines whether or not the initial power transmission efficiency ηi is sufficient to perform wireless power transmission. Specifically, the ECU 74 determines whether or not the initial power transmission efficiency ηi is equal to or higher than an efficiency threshold THη. If the initial power transmission efficiency ηi is sufficient (S9: YES), the ECU 74 in step S10 sets a vertical deviation Dz of the power transmission coil 120 and the power reception coil 140 based on the battery voltage Vbat, the horizontal deviation Vh, and the initial power transmission efficiency ηi. Then, the ECU 74 uses a vertical deviation determination map group 200 (hereinafter also referred to as a "map group 200") (FIG. 5). The map group 200 is included in the resonance frequency DB 104 (FIG. 1) of the memory unit 84.

FIG. 5 is a view conceptually showing content of the vertical deviation determination map group 200 in the embodiment. The map group 200 includes a plurality of efficiency maps 202 (202a to 202f) that store transmission efficiency η for every combination of the battery voltage Vbat, the horizontal deviations Dx, Dy (X direction and Y direction), and the vertical deviation Dz (Z direction).

For example, while the efficiency maps 202a to 202c are those when the battery voltage Vbat is Vbat1, respectively, the efficiency maps 202d to 202f are those when the battery voltage Vbat is Vbat2 (>Vbat1), respectively. In addition, the efficiency maps 202a, 202d are respectively those when the vertical deviation Dz is Dz1. The efficiency maps 202b, 202e are respectively those when the vertical deviation Dz is Dz2 (<Dz1). The efficiency maps 202c, 202f are respectively those when the vertical deviation Dz is Dz3 (<Dz2).

In addition, "−x1, 0, x1" shown in the efficiency maps 202a, 202d in FIG. 5 are a widthwise deviation Dx, and "−y1, 0, 61" is an anteroposterior deviation Dy. In addition, "η11, η12, η13" or the like are transmission efficiency η. Note that in FIG. 5, although the efficiency η of the maps 202a, 202d (η11 to η15, η21 to η25, η31 to η35) has same character, a value of the efficiency η actually entered in the maps 202a, 202d is different.

The ECU 74 identifies a plurality of vertical deviations Dz (Z direction) corresponding to a combination of the battery voltage Vbat and the horizontal deviations Dx, Dy (X direction and Y direction) in the map group 200. Of them, the ECU 74 identifies a deviation having the highest transmission efficiency η as a vertical deviation Dz.

Returning to FIG. 4, in step S11, the ECU 74 calculates a power transmission frequency ft based on the battery voltage Vbat, the horizontal deviations Dx, Dy, the vertical deviation Dz, and the initial power transmission efficiency ηi. Then, the ECU 74 uses a power transmission frequency determination map group 210 (hereinafter also referred to as a "map group 210"). The map group 210 is included in the resonance frequency DB 104 of the memory unit 84 (FIG. 1).

Figure 6:
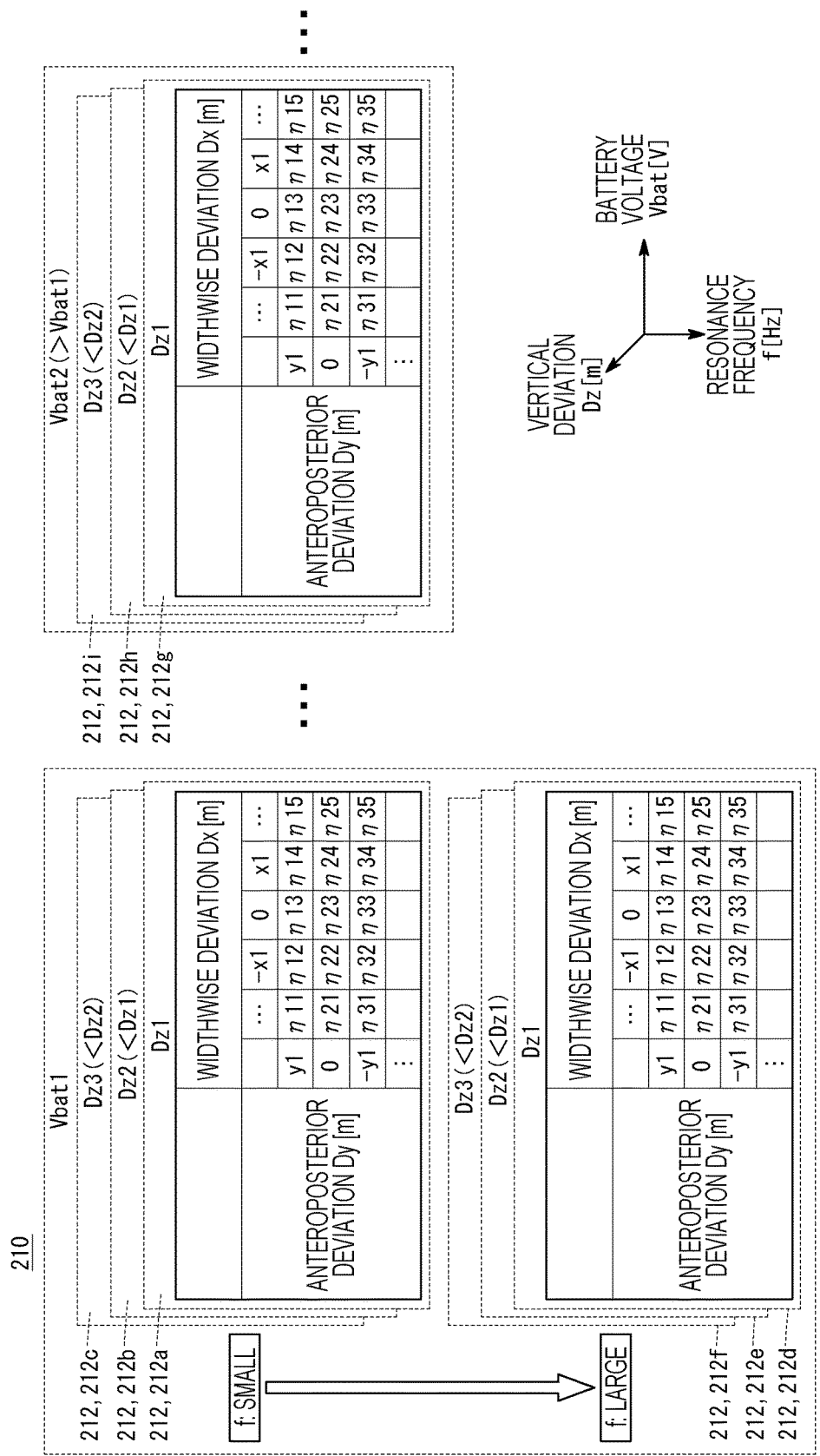
FIG. 6 is a view conceptually and partly showing content of a power transmission frequency determination map group in the embodiment.

FIG. 6 is a view conceptually and partly showing content of the power transmission frequency determination map group 210 in the embodiment. The map group 210 includes a plurality of efficiency maps 212 (212a to 212i) that store the power transmission efficiency η for every combination of the battery voltage Vbat, the horizontal deviations Dx, Dy (X direction and Y direction), the vertical deviation Dz (Z direction), and the resonance frequency f.

For example, while the efficiency maps 212a to 212f are respectively those when the battery voltage Vbat is Vbat1, the efficiency maps 212g to 212i are respectively those when the battery voltage Vbat is Vbat2 (>Vbat1). Of the efficiency maps 212a to 212f, the efficiency maps 212a to 212c are those when the resonance frequency f is a small value f1. The efficiency maps 212d to 212f are those when the resonance frequency f is a large value f2 (Segments of the resonance frequency f is not limited to 2, and may be more than that (for example, any from 3 to 100)).

In addition, the efficiency maps 212a, 212d, 212g are respectively maps when the vertical deviation Dz is Dz1. The efficiency maps 212b, 212e, 212h are respectively maps when the vertical deviation Dz is Dz2 (<Dz1). The efficiency maps 212c, 212f, 212i are respectively those when the vertical deviation Dz is Dz3 (<Dz2).

In the map group 210, the ECU 74 identifies a plurality of resonance frequencies f corresponding to a combination of the battery voltage Vbat, the horizontal deviations Dx, Dy, and the vertical deviation Dz. Of them, the ECU 74 identifies a resonance frequency f having the highest power transmission efficiency η as a frequency to be used in wireless power transmission (hereinafter referred to as a "power transmission frequency ft").

Note that the power transmission frequency determination map group 210 in FIG. 6 may include all contents of the vertical deviation determination map group 200. Thus, in step S10 in FIG. 4, the power transmission frequency determination map group 210 may be used in place of the vertical deviation determination map group 200. Alternatively, the ECU 74 can also combine steps S10 and S11 into one to calculate a power transmission frequency ft based on the battery voltage Vbat, the horizontal deviations Dx, Dy, and the initial power transmission efficiency ηi.

In step S12 in FIG. 4, the ECU 74 transmits the power transmission frequency ft calculated in step S11 to the power transmission apparatus 12. After step S11, the ECU 74 shifts to the power reception control in FIG. 9.

When the ECU 74 returns to step 9 in FIG. 4 and if the initial power transmission efficiency ηi is not sufficient (S9: NO), the ECU 74 needs to readjust a parking position of the vehicle 14. Thus, in step S13, the ECU 74 shows a view requesting a change to the parking position of the vehicle 14 (parking position change view) on the display 72.

In the following step S14, the ECU 74 determines whether or not the vehicle 14 starts movement through manipulation of a driver. When the movement starts (S14: NO), the ECU 74 returns to step S13. When the movement of the vehicle 14 starts (S14: YES), the ECU 74 shifts to step S2.

[2-3. Power Transmission Preparation Control]

Figure 7:
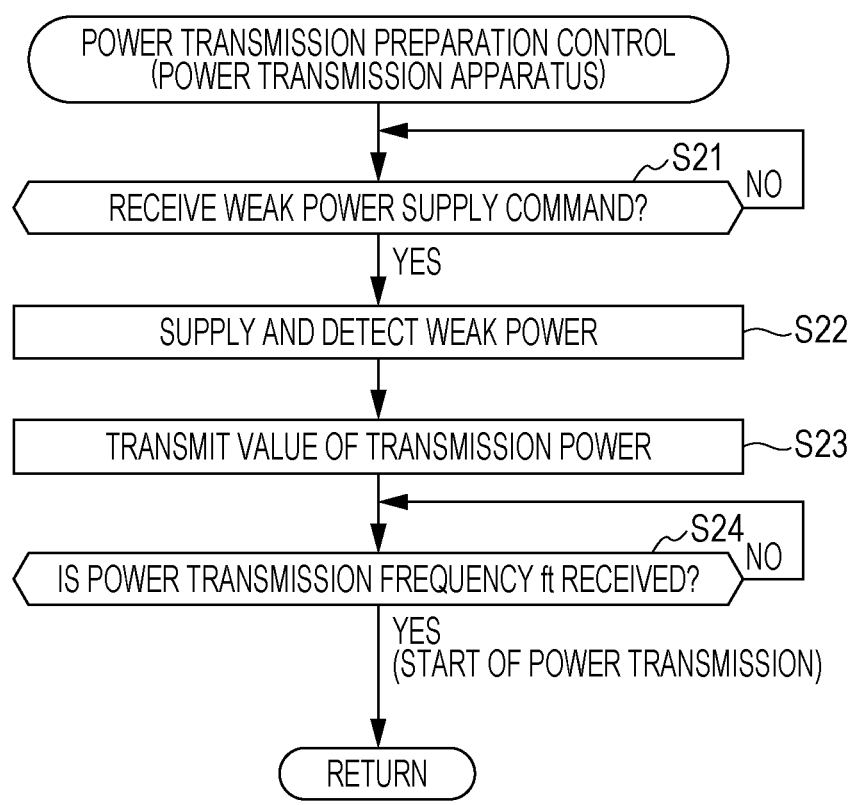
FIG. 7 is a flow chart of power transmission preparation control in the embodiment.

FIG. 7 is a flow chart of power transmission preparation control in the embodiment. Each of steps S21 to S24 in FIG. 7 is performed by the arithmetic unit 38 of the power transmission control device 32 of the power transmission apparatus 12. In step S21, the control device 32 determines whether or not it receives the weak power supply command (S5 in FIG. 4). When the control device 32 does not receive the weak power supply command (S21: NO), it repeats step S21. When the control device receives the weak power supply command (S21: YES), it proceeds to step S22.

In step S22, the control device 32 activates the inverter 22 to supply weak power Pw to the vehicle 14. Then, the control device 32 detects a value of the weak power Pw (transmission power Pt) based on a voltage Vt detected by the voltage sensor 26 and a current It detected by the current sensor 28. In step S23, the control device 32 transmits the detected value of the weak power Pw (transmission power Pt) to the vehicle 14.

Note that in steps S22, S23, the control device 32 may transmit to the vehicle 14 any other parameter indicating the weak power Pw, in place of the weak power Pw itself. For example, the power transmission apparatus 12 may only transmit the voltage Vt and the current It to the vehicle 14 and the ECU 74 of the vehicle 14 may calculate the weak power Pw.

In step S24, the control device 32 determines whether or not it receives a power transmission frequency ft from the vehicle 14 (S12 in FIG. 4). When the control device 32 does not receive the power transmission frequency ft (S24: NO), it repeats step S24. When the control device 32 receives the power transmission frequency ft (S24: YES), it shifts to power transmission control in FIG. 8.

[2-4. Power Transmission Control]

Figure 8:
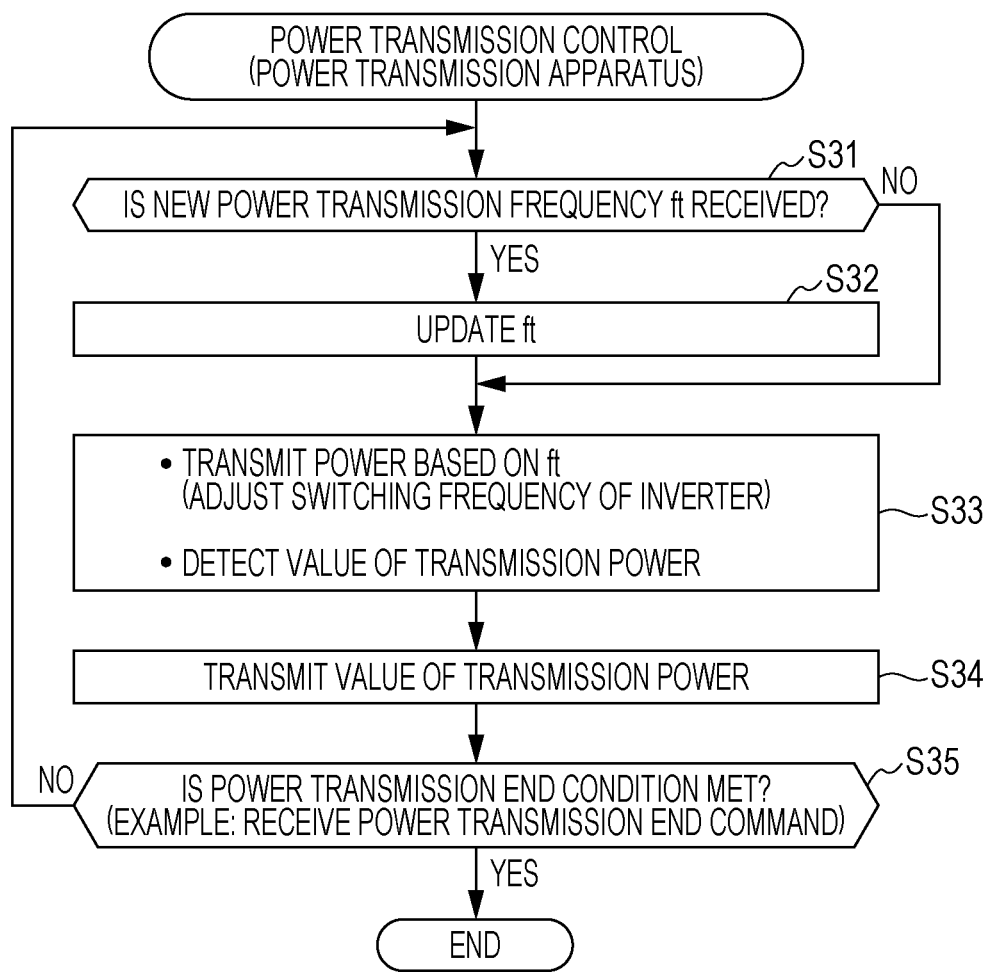
FIG. 8 is a flow chart of power transmission control in the embodiment.

FIG. 8 is a flow chart of power transmission control in the embodiment. Each of steps S31 to S35 in FIG. 8 is performed by the arithmetic unit 38 of the power transmission control device 32 of the power transmission apparatus 12. In step S31, the control device 32 determines whether or not it receives a new power transmission frequency ft (S52 in FIG. 9) from the vehicle 14 by way of the communication device 30. When the control device 32 receives the new power transmission frequency ft (S31: YES), the control device 32 updates the power transmission frequency ft in step S32. After step S32 or when the control device 32 does not receive the new power transmission frequency ft (S31: NO), it proceeds to step S33.

In step S33, the control device 32 activates the inverter 22 to perform power transmission to the vehicle 14 based on the power transmission frequency ft. More specifically, the control device 32 adjusts a switching frequency of each switching element 112 (FIG. 3) of the inverter 22, causing it to correspond to the power transmission frequency ft. Then, the control device 32 detects a value of the power transmission power Pt based on the voltage Vt detected by the voltage sensor 26 and the current It detected by the current sensor 28. In step S34, the control device 32 transmits the detected value of the transmission power Pt to the vehicle 14.

Note that in steps S33, S34, in place of the transmission power Pt itself, the control device 32 may transmit to the vehicle 14 any other parameter indicating the transmission power Pt. For example, the power transmission apparatus 12 may only transmit the voltage Vt and the current It to the vehicle 14, and the ECU 74 of the vehicle 14 may calculate the transmission power Pt.

In step S35, the control device 32 determines whether or not the power transmission end condition is met. The power transmission end condition includes reception of the power transmission end command (S46 in FIG. 9) from the vehicle 14, for example. When the power transmission end condition is not met (S35: NO), the control device 32 returns to step S31. When the power transmission end condition is met (S35: YES), power transmission ends.

[2-5. Power Reception Control]

Figure 9:
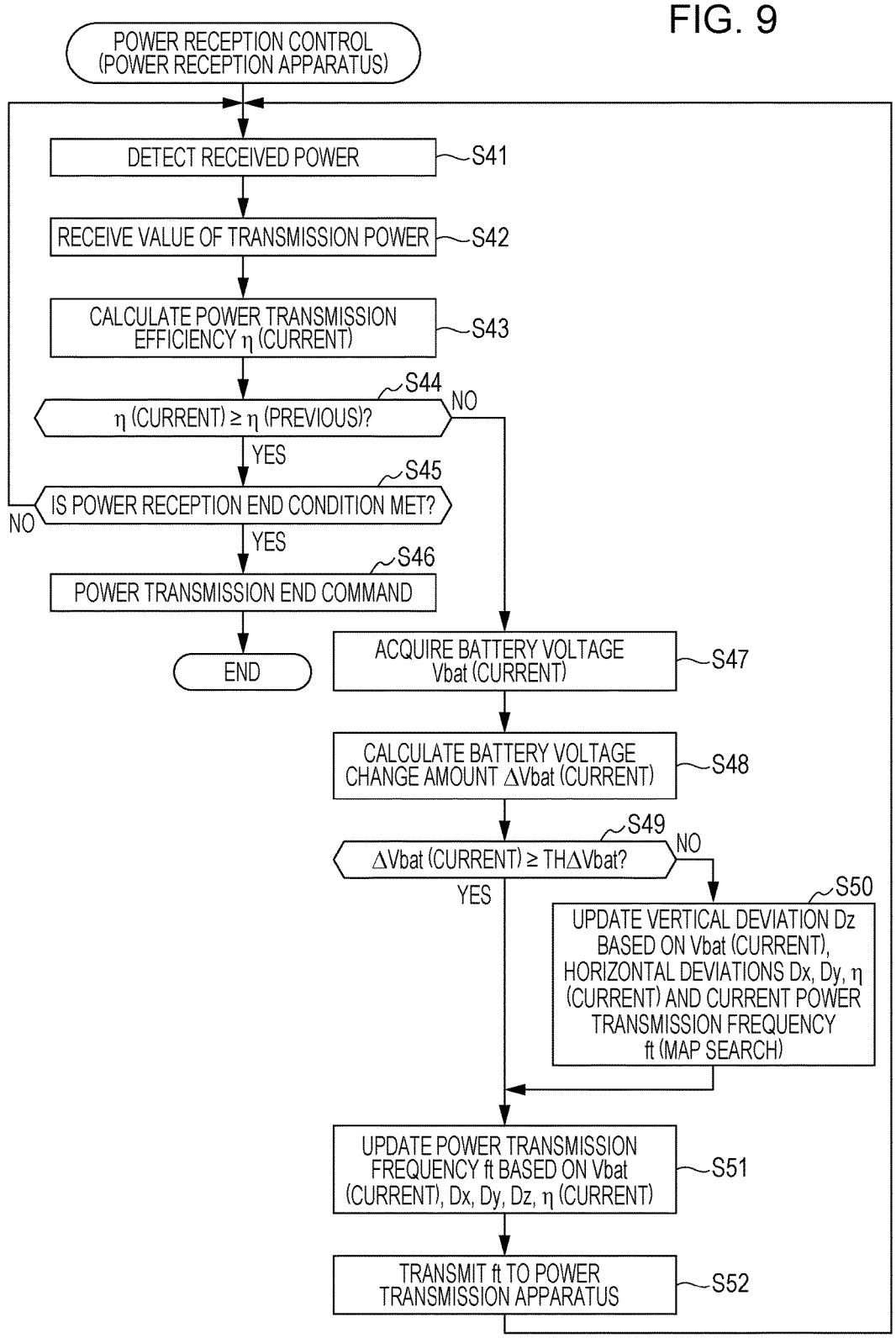
FIG. 9 is a flow chart of power reception control in the embodiment.

FIG. 9 is a flow chart of power reception control in the embodiment. Each of steps S41 to S52 in FIG. 9 is performed by the arithmetic unit 82 of the ECU 74. Of steps S41 to S52, steps S41 to S43 are performed by the power transmission efficiency calculation section 92. Step S50 is performed by the vertical direction detector 102. Step S51 is performed by the power transmission frequency setting section 94. Step S52 is performed by the power transmission request section 96.

In step S41, the ECU 74 detects reception power Pr received from the power transmission apparatus 12. The reception power Pr is calculated as a product of a battery voltage Vbat from the voltage sensor 56 and a battery current Ibat from the current sensor 58. In step S42, the ECU 74 receives the value of transmission power Pt detected by the power transmission apparatus 12 (See S34 in FIG. 8). In step S43, the ECU 74 calculates power transmission efficiency η (hereinafter also referred to "power transmission efficiency η (current)" in a current calculation cycle. The power transmission efficiency η (current) is determined with a ratio of reception power Pr to transmission power Pt (η(current)=Pr (current)/Pt (current)).

In step S44, the ECU 74 determines whether or not power transmission efficiency η (current) is equal to or higher than power transmission efficiency η (previous) (hereinafter also referred to "power transmission efficiency η (last)") in the last calculation cycle. When the power transmission efficiency η (current) is equal to or higher than the power transmission efficiency η (last) (S44: YES), the ECU 74 proceeds to step S45.

In step S45, the ECU 74 determines whether or not the power reception end condition is met. As the power reception end condition, for example, it can be used that SOC of the battery 54 is more than an SOC threshold. Alternatively, it may also be used that a battery voltage Vbat is more than a voltage threshold. When the power reception end condition is not met (S45: NO), the ECU 74 returns to step S41. When the power reception end condition is met (S45: YES), the ECU 74 transmits the power transmission end command to the power transmission apparatus 12 in step S46 to end power reception control.

When the ECU 74 returns to step S44 and the power transmission efficiency η (current) is not equal to or higher than the power transmission efficiency η (previous) S44: NO), the ECU 74 acquires a battery voltage Vbat from the voltage sensor 56 in step S47. In step S48, the ECU 74 calculates a battery voltage change amount ΔVbat (hereinafter also referred to as a "change amount ΔVbat"). The change amount ΔVbat is a change amount [V/sec] of the battery voltage Vbat per unit time and calculated as a difference between a battery voltage Vbat (current) in a current operation cycle and a battery voltage Vbat (previous) in the last operation cycle (Vbat (current)=Vbat (current)−Vbat (last time)).

In step S49, the ECU 74 determines whether or not the change amount ΔVbat (current) is equal to or higher than a threshold THΔvbat (hereinafter referred to as "change amount threshold THΔvbat"). The threshold THΔvbat is a threshold for determining that the battery 54 is charged by power transmission from the power transmission apparatus 12 and thus the battery voltage Vbat has changed.

When the change amount ΔVbat (current) is not equal to or higher than the threshold THΔvbat (S49: NO), the battery 54 is not efficiently charged. In this case, in step S50, the ECU 74 updates a vertical deviation Dz based on a battery voltage Vbat (current), horizontal deviations Dx, Dy, power transmission efficiency η (current), and a current power transmission frequency ft. Then, the ECU 74 uses a vertical deviation determination map group 200 (FIG. 5) (map search). Note that for the deviations Dx, Dy here, a value acquired in the power reception preparation control (S4 in FIG. 4) can be used. Alternatively, deviations Dx, Dy acquired thereafter may also be used.

When the change amount ΔVbat (current) is equal to or higher than the threshold THΔvbat (S49: YES) or after step S50, the ECU 74 in step S51 sets, as a new power transmission frequency ft, or updates a resonance frequency f with the power transmission efficiency η being the highest value, of a combination of a battery voltage Vbat (current), horizontal deviations Dx, Dy, and a vertical deviation Dz, which are stored in the power transmission frequency determination map group 210 (FIG. 6).

In step S52, the ECU 74 transmits the new power transmission frequency ft after updating to the power transmission apparatus 12. After step S52, the ECU 74 returns to step S41.

3. Effect of the Embodiment

As described above, according to the embodiment, a resonance frequency f, which corresponds to a combination of the relative distance Dtr between the power transmission coil 120 and the power reception coil 140 and the initial power transmission efficiency ηi based on a default value of the resonance frequency f, is read from the resonance frequency DB 104 and set as a power transmission frequency ft used in wireless power transmission (wireless power feeding) (S11 in FIG. 4). Thus, it becomes possible to promptly set a value with good power transmission efficiency η to the power transmission frequency ft used in wireless power transmission and reduce power transmission time.

In addition, according to the embodiment, the camera 64 and the relative distance calculation section 90 are provided on the side of the vehicle 14 (power reception apparatus) (FIG. 1), and a power transmission frequency ft is set on the side of the vehicle 14 (power reception apparatus) (S11 in FIG. 4). This can enable simplification of a configuration on the side of the power transmission apparatus 12.

In the embodiment, the relative distance calculation section 90 includes the horizontal direction detector 100 configured to detect horizontal deviations Dx, Dy of the power transmission coil 120 and the power reception coil 140 (FIG. 1). The resonance frequency DB 104 stores a combination of horizontal deviations Dx, Dy and power transmission efficiency η, and a resonance frequency f corresponding to the combination (FIG. 5). The power transmission frequency setting section 94 reads from the resonance frequency DB 104 (power transmission frequency determination group 210 of FIG. 6) the resonance frequency f corresponding to the combination of horizontal deviations Dx, Dy and the initial power transmission efficiency ηi to set it as a power transmission frequency ft (S11 in FIG. 4). With this, the power transmission frequency setting section 94 sets the power transmission frequency ft based on the horizontal deviations Dx, Dy and the initial power transmission efficiency ηi. Thus, a configuration of the vehicle 14 can be simplified by omitting a device only used to detect a vertical deviation Dz of the power transmission coil 120 and the power reception coil 140.

In the embodiment, the vehicle 14 (power reception apparatus) includes the voltage sensor 56 (state of charge parameter acquisition section, state-of-charge-parameter acquisition device) configured to acquire a battery voltage Vbat (state of charge parameter) that indicates a charge state of the battery 54 (state of charge of the electricity storage) (FIG. 1). The power transmission frequency setting section 94 updates the power transmission frequency ft depending on the battery voltage Vbat (S47 to S51 in FIG. 9). This facilitates maintenance of selection of a preferred power transmission frequency ft even when the preferred power transmission frequency ft changes due to a change in the charge state of the battery 54 involved in wireless power transmission. Thus, the power transmission efficiency η can be improved and power transmission time corresponding to a necessary amount of power transmission can be reduced.

In the embodiment, the vehicle 14 (power reception apparatus) includes the voltage sensor 56 configured to acquire the battery voltage Vbat that indicates the charge state of the battery 54 (FIG. 1). The resonance frequency DB 104 (power transmission frequency determination map group 210) stores a combination of deviations Dx, Dy, Dz (relative distance Dtr), a combination of the power transmission efficiency η and the battery voltage Vbat, and a resonance frequency ft corresponding to this combination (FIG. 6). The power transmission frequency setting section 94 reads from the resonance frequency DB 104 the resonance frequency f corresponding to the combination of the deviations Dx, Dy, Dz and the initial power transmission efficiency ηi to set it as a power transmission frequency ft (S11 in FIG. 4).

With this, in addition to the deviations Dx, Dy, Dz and the initial power transmission efficiency ηi, the battery voltage Vba is also used to set the power transmission frequency ft. This facilitates maintenance of selection of a preferred power transmission frequency ft even when the preferred power transmission frequency ft changes depending on a charge state of the battery 54. This can improve the power transmission efficiency η and reduce power transmission time corresponding to a necessary amount of power transmission.

In the embodiment, during wireless power transmission, when the power transmission efficiency η (current) falls below the power transmission efficiency (previous) (efficiency threshold) (S44 in FIG. 9: NO) and when the battery voltage change amount ΔVbat falls below the change amount threshold THΔvbat (S49: NO), the power transmission frequency setting section 94 reads from the resonance frequency DB 104 a resonance frequency f corresponding to a combination of the deviations Dx, Dy, Dz (relative distance Dtr), the power transmission efficiency η, and the battery voltage Vbat to update the power transmission ft (S51).

With this, when the power transmission efficiency η is relatively low or the charge state in the battery 54 does not change (more specifically, when the charge state is not improved), it becomes possible to improve the power transmission efficiency η by updating the power transmission frequency ft. In addition, since the relative distance Dtr of the power transmission coil 120 and the power reception coil 140 is used to update the power transmission frequency ft during wireless power transmission, it becomes possible to control any deterioration of the power transmission efficiency η when the relative distance Dtr changes during wireless power transmission (when occupants get on and off or when cargo is loaded or unloaded).

While in JP2011-259585A, the entire contents of which are incorporated herein by reference, reactance of the variable coil 32 and electrostatic capacitance CV of the variable condenser 33 are set based on a resonance frequency fr (S3 in FIG. 5 in JP2011-259585A), such processing is not performed in the embodiment. In other words, in the embodiment, neither variable coil nor variable condenser is provided (FIG. 1). This can enable simplification of a configuration of the power reception circuit 62 of the vehicle 14.

B. Variation

In addition, it is needless to say that the disclosure is not limited to the embodiment described above and may take various configurations based on the description herein. For example, the following configuration can be adopted.

1. Target of Application

In the embodiment described above, while the wireless power transmission system 10 is used for power transmission (charging of the battery 54) to the vehicle 14, which is an electric vehicle (FIG. 1), the system 10 may also be used in other electric-powered vehicles (hybrid vehicle, fuel cell vehicle or the like). Alternatively, if the relative distance Dtr between the power transmission coil 120 and the power reception coil 140 may vary, the system 10 can be used not only for the vehicle 14 but also for other mobile object (ship or aircraft or the like) that requires power transmission. Alternatively, the system 10 may be applied to manufacturing equipment, robots, or home electric appliances.

2. Camera 64 (Relative Distance Detection Section)

In the embodiment described above, a combination of deviations Dx, Dy, Dz (relative distance Dtr) was detected using an XY image IXY of the camera 64 (imager), power transmission efficiency η, and a battery voltage Vbat (S4, S10 in FIG. 4, S50 in FIG. 9). However, this is not the only way from the standpoint of detecting the relative distance Dtr, for example. For example, the relative distance Dtr can also be detected based on the XY image IXY and the power transmission efficiency η, rather than using the battery voltage Vbat. Alternatively, the relative distance Dtr may also be detected by causing a laser displacement meter provided in the vehicle 14 or the power transmission apparatus 12 to detect a vertical direction (Z direction) and/or a horizontal direction (XY direction). Note that detection used herein may include not only direct detection but also indirect detection (estimation).

The camera 64 is provided in the vehicle 14 (FIG. 1) in the embodiment described above, which is not only the way from the standpoint of detecting the relative distance Dtr. Instead, the camera 64 may also be provided on the side of the power transmission apparatus 12.

3. Setting of a Transmission Power Frequency Ft

In the embodiment described above, the processing related to setting and updating of a power transmission frequency ft (S4 to S12 in FIG. 4, S41 to S44, S47 to S52 in FIG. 9) is performed on the side of the vehicle 14. However, from the standpoint of setting or updating of the power transmission frequency ft, for example, the processing is not limited to this. Either setting of the power transmission frequency ft before power transmission starts or updating of the power transmission frequency ft during power transmission or both thereof can be performed by the control device 32 of the power transmission apparatus 12.

In this case, some or all of the relative distance calculation section 90, the power transmission efficiency calculation section 92, the power transmission frequency setting section 94, and the resonance frequency DB 104 may be provided on the side of the power transmission apparatus 12. Alternatively, in a configuration in which the communication device 30 of the power transmission apparatus 12 or the communication device 70 of the vehicle 14 (power reception apparatus) communicates with an external server, some or all of the relative distance calculation section 90, the power transmission efficiency calculation section 92, the power transmission frequency setting section 94, and the resonance frequency DB 104 may be provided in the external server.

In the embodiment described above, it is assumed that a default value of a power transmission frequency ft used during supply of weak power Pw in the power transmission preparation processing (S22 in FIG. 7) is a unique value. However, this is not only the way from the standpoint of setting an appropriate power transmission frequency ft before determination of an optimal power transmission efficiency η, which relatively takes long, or from the standpoint of setting of an appropriate power transmission frequency ft for weak power Pw, for example. For example, weak power Pw can also be supplied by using a power transmission frequency ft that is set based on horizontal deviations Dx, Dy. Alternatively, if a configuration is such that a relative distance Dtr (horizontal deviations Dx, Dy and a vertical deviation Dz) can be detected in advance, weak power Pw may also be supplied by using the power transmission frequency ft that is set based on the relative distance Dtr.

In the embodiment described above, supply of weak power Pw in the power transmission preparation control (S22 in FIG. 7) and wireless power transmission in the power transmission control (S33 in FIG. 8) are considered separately. However, this is not the only way from the standpoint of using a default value of a power transmission frequency ft at the beginning of power supply and then using a relative distance Dtr and initial power transmission efficiency ηi to set or update the power transmission frequency ft, for example. For example, in wireless power transmission under power transmission control, a default value of the power transmission frequency ft may be initially used and then the relative distance Dtr and the initial power transmission efficiency ηi may be used to set or update the power transmission frequency ft.

In the embodiment described above, each efficiency map 212 (212a to 212i) stores power transmission efficiency η for every combination of a battery voltage Vbat, deviations Dx, Dy, Dz, and a resonance frequency f (FIG. 6). However, this is not only the way from the standpoint of setting (including updating) the power transmission frequency ft, for example. For example, it is also possible to form each map 212 by storing the power transmission frequency ft (resonance frequency f) corresponding to the highest power transmission efficiency η for every combination of the battery voltage Vbat and the deviations Dx, Dy, Dz, so that map 212 may include no data on the power transmission efficiency η (substantially, the power transmission efficiency η is reflected in the resonance frequency f). Alternatively, it is also possible to form each map 212 by storing the power transmission frequency ft (resonance frequency f) corresponding to the highest power transmission efficiency η for every combination of the deviations Dx, Dy, Dz so that the map 212 may include no data on the battery voltage Vbat and the power transmission efficiency η.

It is also possible that each efficiency map 212 (212a to 212i) does not reflect a battery voltage Vbat. Alternatively, each efficiency map 212 (212a to 212i) may use any electricity storage parameter (SOC, for example) other than the battery voltage Vbat of state of charge parameters indicating a state of charge (charge state) of the battery 54, in place of or in addition to the battery voltage Vbat. In other words, the SOC sensor 60 or the like may be used as the state of charge parameter acquisition section in place of the voltage sensor 56.

Each efficiency map 212 (212a to 212i) may include any element other than the battery voltage Vbat, the deviations Dx, Dy, Dz, the resonance frequency f (power transmission frequency ft), and the power transmission efficiency η. For example, in the embodiment described above, it is assumed that a target value of transmission power Pt from the power transmission apparatus 12 to the vehicle 14 is constant. However, the transmission power Pt may be changed for every specification of the vehicle 14 or for every specification of the power transmission device 12, or depending on the power transmission efficiency η in the efficiency map 212. In this case, each map 212 can be provided for each target value of the transmission power Pt, in addition to the battery voltage Vbat, the deviations Dx, Dy, Dz, the resonance frequency f (power transmission frequency ft), and the power transmission efficiency η.

In the embodiment described above, a value based on an actually measured value (product of a voltage Vt and a current It) is made the transmission power Pt used for calculation of the power transmission efficiency η (S8 in FIG. 4 and S43 in FIG. 9). However, from the standpoint of setting the power transmission frequency ft, for example, the transmission power Pt may also be a fixed value.

4. Others

In the embodiment described above, power is transmitted from the power transmission apparatus 12 to the vehicle 14. However, the disclosure may also be applied to a case in which power is transmitted from the vehicle 14 to the power transmission apparatus 12.

A power reception apparatus according to the disclosure uses resonant magnetic coupling to receive wireless power transmission from a power transmission apparatus, and includes: a power reception coil configured to receive power from a power transmission coil of the power transmission apparatus; a relative distance detection section configured to detect a relative distance between the power transmission coil and the power reception coil; a power transmission efficiency detection section configured to detect initial power transmission efficiency of the wireless power transmission performed by using an initial default value of a resonance frequency; a database configured to store a combination of the relative distance and the power transmission efficiency, and the resonance frequency corresponding to the combination; a power transmission frequency setting section configured to read from the database the resonance frequency corresponding to the combination of the relative distance and the initial transmission efficiency, and to set the read resonance frequency as a power transmitting frequency to be used in the wireless power transmission; and a power transmission request section configured to notify the power transmission apparatus of the power transmission frequency set by the power transmission frequency setting section to request the wireless power transmission with the power transmission frequency.

According to the disclosure, a resonance frequency corresponding to a combination of a relative distance between a power transmission coil of a power transmission apparatus and a power reception coil of a power reception apparatus, and an initial power transmission efficiency based on a default value of a resonance frequency is read from a database, and set as a power transmission frequency to be used in wireless power transmission. Thus, it becomes possible to promptly set a value with good transmission efficiency to the power transmission frequency to be used in the wireless power transmission and to reduce the power transmission time.

In addition, according to the disclosure, a relative distance detection section is provided on the side of the power reception apparatus, and a power transmission frequency is set on the side of the power reception apparatus. Thus, a configuration on the side of the power transmission apparatus can be simplified.

The relative distance detection section may also include a horizontal direction detector configured to detect a horizontal deviation of the power transmission coil and the power reception coil. In addition, the database may store a combination of the horizontal deviation and the power transmission efficiency, and the resonance frequency corresponding to the combination. The power transmission frequency setting section may read from the database the resonance frequency corresponding to the combination of horizontal deviation and the initial power transmission efficiency, and sets the read resonance frequency as the power transmission frequency.

With this, the power transmission frequency is set based on the horizontal deviation and the initial power transmission efficiency. Thus, a device used only for detecting a vertical deviation of the power transmission coil and the power reception coil can be omitted, and a configuration of the power reception apparatus can be simplified.

The power reception apparatus may further include a state of charge parameter acquisition section configured to acquire a state of charge parameter which indicates a state of charge of the electricity storage. The power transmission frequency setting section may update the power transmission frequency depending on the state of charge parameter. This facilitates maintenance of selection of a preferred power transmission frequency even when the preferred power transmission frequency changes due to a change in the state of charge of the electricity storage involved in wireless power transmission. Thus, the power transmission efficiency can be improved and the power transmission time corresponding to a necessary amount of power transmission can be reduced.

If the power reception apparatus includes the state of charge parameter acquisition section, the database may also store a combination of the relative distance, the power transmission efficiency, and the state of charge parameter, and the resonance frequency corresponding to the combination. In addition, the power transmission frequency setting section may read from the database the resonance frequency corresponding to the combination of the relative distance, the initial power transmission efficiency, and the state of charge parameter to set the resonance frequency as the power transmission frequency.

With this, the state of charge parameter is also used to set a power transmission frequency, in addition to a relative distance and initial power transmission efficiency. This facilitates maintenance of selection of a preferred power transmission frequency even when the preferred power transmission frequency changes due to a change in the state of charge of the electricity storage involved. Thus, the power transmission efficiency can be improved and power transmission time corresponding to a necessary amount of power transmission can be reduced.

The state of charge parameter acquisition section may also include a voltage sensor configured to detect a voltage of the electricity storage. The database may store a combination of the relative distance, the power transmission efficiency, and the voltage of the electricity storage, and the resonance frequency corresponding to the combination. During the wireless power transmission, if the power transmission efficiency falls below an efficiency threshold and when a change amount per unit time of the voltage of the electricity storage falls below a change amount threshold, the power transmission frequency setting section may read from the database the resonance frequency corresponding to the combination of the relative distance, the power transmission efficiency, and the voltage of the electricity storage to update the power transmission frequency.

With this, when the power transmission efficiency is relatively low or the state of charge in the electricity storage does not change (more specifically, the state of charge is not improved), it becomes possible to improve the power transmission efficiency by updating the power transmission frequency. In addition, since the relative distance between the power transmission coil and the power reception coil is used to update a power transmission frequency during wireless power transmission, it becomes possible to control any deterioration of the power transmission efficiency when the relative distance between the power transmission coil and the power reception coil changes during the wireless power transmission (when occupants get on and off or cargo is loaded or unloaded).

A wireless power transmission method according to the disclosure is to use the resonant magnetic coupling to perform wireless power transmission from a power transmission apparatus to a power reception apparatus. The method includes the steps of: detecting a relative distance of a power transmission coil of the power transmission apparatus and a power reception coil of the power reception apparatus; detect initial power transmission efficiency by performing the wireless power transmission using a default value of a resonance frequency from the power transmission apparatus to the power reception apparatus; reading from a database the resonance frequency corresponding to a combination of the relative distance and the initial power transmission efficiency, and setting the read resonance frequency as a power transmission frequency to be used in the wireless power transmission; and performing the wireless power transmission using the power transmission frequency.

According to the disclosure, power transmission efficiency and power transmission time can be improved.

Obviously, numerous modifications and variations of the present invention are possible in light of the above teachings. It is therefore to be understood that within the scope of the appended claims, the invention may be practiced otherwise than as specifically described herein.

What is claimed is:

1. A power reception apparatus that uses resonant magnetic coupling to receive wireless power transmission from a power transmission apparatus, comprising:
   a power reception coil configured to receive power from a power transmission coil of the power transmission apparatus;
   a relative distance detection section configured to detect a relative distance between the power transmission coil and the power reception coil;
   a power transmission efficiency detection section configured to detect initial power transmission efficiency of the wireless power transmission performed by using a default value of a resonance frequency;
   a database configured to store a combination of the relative distance and the power transmission efficiency, and the resonance frequency corresponding to the combination;
   a power transmission frequency setting section configured to read from the database the resonance frequency corresponding to the combination of the relative distance and the initial power transmission efficiency and to set the read resonance frequency as a power transmission frequency to be used in the wireless power transmission; and a power transmission request section configured to notify the power transmission apparatus of the power transmission frequency set by the power transmission frequency setting section and request the wireless power transmission with the power transmission frequency.

2. The power reception apparatus according to claim 1, wherein
the relative distance detection section comprises a horizontal direction detector configured to detect a horizontal deviation of the power transmission coil and the power reception coil,
the database stores a combination of the horizontal deviation and the power transmission efficiency, and the resonance frequency corresponding to the combination, and
the power transmission frequency setting section reads from the database the resonance frequency corresponding to the horizontal deviation and the initial power transmission efficiency, and sets the read resonance frequency as the power transmission frequency.

3. The power reception apparatus according to claim 1, further comprising:
a state of charge parameter acquisition section configured to acquire a state of charge parameter indicating a state of charge of an electricity storage, wherein
the power transmission frequency setting section updates the power transmission frequency depending on the state of charge parameter.

4. The power reception apparatus according to claim 1, further comprising:
a state of charge parameter acquisition section configured to acquire a state of charge parameter indicating a state of charge of an electricity storage, wherein
the database stores a combination of the relative distance, the power transmission efficiency, and the state of charge parameter, and the resonance frequency corresponding to the combination, and
the power transmission frequency setting section reads from the database the resonance frequency corresponding to a combination of the relative distance, the initial power transmission efficiency, and the state of charge parameter, and sets the read resonance frequency as the power transmission frequency.

5. The power reception apparatus according to claim 3, wherein
the state of charge parameter acquisition section includes a voltage sensor configured to detect a voltage of the electricity storage,
the database stores a combination of the relative distance, the power transmission efficiency, and a voltage of the electricity storage, and the resonance frequency corresponding to the combination, and
during the wireless power transmission, if the power transmission efficiency falls below an efficiency threshold and if a change amount per unit time of the voltage of the electricity storage falls below a change amount threshold, the power transmission frequency setting section updates the power transmission frequency by reading from the database the resonance frequency corresponding to the combination of the relative distance, the power transmission efficiency, and the voltage of the electricity storage.

6. A power reception apparatus comprising:
a power reception coil to receive power from a power transmission coil of a power transmission apparatus in wireless power transmission;
a relative distance detector to detect a relative distance between the power transmission coil and the power reception coil;
a memory to store a database comprising:
first combinations each including a reference relative distance and a reference state-of-charge parameter indicating a state of charge of an electricity storage; and
resonance frequencies respectively corresponding to the first combinations;
a power transmission frequency selector to select a power transmission frequency from the resonance frequencies of the database based on a combination of the relative distance and a state of charge parameter acquired by a state-of-charge-parameter acquisition device; and
a power transmission request device to transmit the power transmission frequency to the power transmission apparatus to perform the wireless power transmission based on the power transmission frequency.

7. The power reception apparatus according to claim 6, wherein
the relative distance detector comprises a horizontal direction detector to detect a horizontal deviation between the power transmission coil and the power reception coil,
the database comprises
second combinations each including a reference horizontal deviation and the reference state-of-charge parameter, and
the resonance frequencies respectively corresponding to the second combinations, and
the power transmission frequency selector is connected to the memory to select the power transmission frequency from the resonance frequencies of the database based on a combination of the horizontal deviation and the state of charge parameter.

8. The power reception apparatus according to claim 6, further comprising:
the state-of-charge-parameter acquisition device to acquire the state of charge parameter indicating the state of charge of the electricity storage.

9. The power reception apparatus according to claim 8, wherein
the power transmission frequency selector is connected to the state-of-charge-parameter acquisition device to update the power transmission frequency depending on the state of charge parameter.

10. The power reception apparatus according to claim 8, wherein
the database comprises
third combinations each including the reference relative distance, a reference power transmission efficiency, and the reference state-of-charge parameter, and
the resonance frequencies respectively corresponding to the third combinations, and
the power transmission frequency selector is connected to the memory to select the power transmission frequency from the resonance frequencies of the database based on a combination of the relative distance, the state of charge parameter, and a highest power transmission efficiency among reference power transmission efficiencies corresponding to the relative distance and the state of charge parameter in the third combinations.

11. The power reception apparatus according to claim 8, wherein the state-of-charge-parameter acquisition device includes a voltage sensor to detect a voltage of the electricity storage, the database comprises fourth combinations each including the reference relative distance, a reference power transmission efficiency, and a reference voltage of the electricity storage, and the resonance frequencies respectively corresponding to the fourth combinations, and during the wireless power transmission, if the power transmission efficiency is lower than an efficiency threshold and if a change amount of the voltage per unit time is less than a change amount threshold, the power transmission frequency selector selects the power transmission frequency from the resonance frequencies of the database based on a combination of the relative distance, the voltage, and a highest power transmission efficiency among reference power transmission efficiencies corresponding to the relative distance and the voltage in the fourth combinations to update the power transmission frequency.

12. A wireless power transmission method comprising:

detecting a relative distance between a power transmission coil of a power transmission apparatus and a power reception coil of a power reception apparatus by using a relative distance detector;

selecting, by using a power transmission frequency selector, a power transmission frequency from a database comprising:

first combinations each including a reference relative distances and a reference state-of-charge parameter indicating a state of charge of an electricity storage; and resonance frequencies respectively corresponding to the first combinations, based on a combination of the relative distance and a state of charge parameter acquired by a state-of-charge-parameter acquisition device; and transmitting the power transmission frequency from a power transmission request device to the power transmission apparatus to perform wireless power transmission based on the power transmission frequency.

* * * * *